United States Patent [19]

Singer

[11] Patent Number: 5,370,894
[45] Date of Patent: * Dec. 6, 1994

[54] CARBOHYDRATE CREAM SUBSTITUTE

[75] Inventor: Norman S. Singer, Highland Park, Ill.

[73] Assignee: The Nutrasweet Company, Deerfield, Ill.

[*] Notice: The portion of the term of this patent subsequent to Oct. 6, 2009 has been disclaimed.

[21] Appl. No.: 956,788

[22] Filed: Oct. 5, 1992

Related U.S. Application Data

[63] Continuation-in-part of Ser. No. 678,897, Mar. 28, 1991, Pat. No. 5,153,020, which is a continuation of Ser. No. 367,322, Jun. 20, 1989, which is a continuation-in-part of Ser. No. 211,494, Jun. 24, 1988, Pat. No. 4,911,946.

[51] Int. Cl.$^5$ .............................................. A23L 1/307
[52] U.S. Cl. .................................. 426/567; 426/570; 426/572; 426/589; 426/582; 426/659; 426/658; 426/602; 426/104; 426/804; 426/605
[58] Field of Search ............... 426/104, 658, 804, 567, 426/583, 582, 589, 586, 602, 605, 570, 572, 659

[56] References Cited

U.S. PATENT DOCUMENTS

| | | | |
|---|---|---|---|
| 2,801,242 | 7/1957 | Kerr et al. | 426/578 X |
| 3,023,104 | 2/1962 | Battista | 426/96 |
| 3,573,058 | 3/1971 | Tiemstra | 426/804 |
| 3,600,186 | 8/1971 | Mattson | 99/1 |
| 3,867,554 | 2/1975 | Sucher et al. | 426/60 |
| 3,954,976 | 5/1976 | Mattson et al. | 424/180 |
| 4,005,195 | 1/1977 | Jandacek et al. | 424/180 |
| 4,005,196 | 1/1977 | Jandacek | 424/180 |
| 4,103,037 | 7/1978 | Bodor et al. | 426/575 |
| 4,122,196 | 10/1978 | Robbins et al. | 426/60 |
| 4,143,163 | 3/1979 | Hutchinson et al. | 426/96 |
| 4,143,174 | 3/1979 | Shah et al. | 426/570 |
| 4,169,160 | 9/1979 | Wingerd et al. | 426/40 |
| 4,209,503 | 6/1980 | Shah et al. | 424/49 |
| 4,263,334 | 4/1981 | McGinley | 426/573 |
| 4,305,964 | 12/1981 | Moran et al. | 426/99 |
| 4,308,294 | 12/1981 | Rispoli et al. | 426/564 |
| 4,375,481 | 3/1983 | Kuwabara et al. | 426/93 |
| 4,438,148 | 3/1984 | O'Rourke et al. | 426/579 |
| 4,452,721 | 6/1984 | Turbak et al. | 252/310 |
| 4,510,166 | 4/1985 | Lenchin et al. | 426/565 |
| 4,563,360 | 1/1986 | Soucie et al. | 426/104 |
| 4,615,892 | 10/1986 | Morehouse et al. | 426/250 |
| 4,707,374 | 11/1987 | King et al. | 426/572 |
| 4,734,287 | 3/1988 | Singer et al. | 426/41 |
| 4,744,987 | 5/1988 | Mehra et al. | 424/156 |
| 4,762,726 | 8/1988 | Soucie et al. | 426/602 |
| 4,810,646 | 3/1989 | Jamas et al. | 435/101 |
| 4,814,195 | 3/1989 | Yokoyama et al. | 426/633 |
| 4,828,396 | 3/1989 | Singer et al. | 99/453 |
| 4,894,250 | 1/1990 | Musson et al. | 426/573 |
| 4,911,946 | 3/1990 | Singer et al. | 426/658 |
| 4,959,466 | 9/1990 | White | 426/804 |
| 4,962,094 | 10/1990 | Jamas | 514/892 |
| 4,963,383 | 10/1990 | Nozaki et al. | 426/804 |
| 5,011,701 | 4/1991 | Baer et al. | 426/804 |
| 5,153,020 | 10/1992 | Singer et al. | 426/567 |

FOREIGN PATENT DOCUMENTS

| | | | |
|---|---|---|---|
| 0040452 | 10/1978 | Australia | 426/658 |
| 340035 | 11/1989 | European Pat. Off. | |
| 347402 | 12/1989 | European Pat. Off. | |
| 8900325 | 11/1989 | WIPO | |
| 8904734 | 5/1990 | WIPO | |

OTHER PUBLICATIONS

Atwell, et al., Characterization of Quinoa Starch, Cereal Chem., 60:9 (1983).
FMC Pahmplet, "The Plural of Cellulose is Avicel mcc.", (1984).
Hood, et al., J. Food Sci., vol. 39, pp. 117-120 (1974).

Primary Examiner—Jeanette Hunter
Attorney, Agent, or Firm—Marshall, O'Toole, Gerstein, Murray & Borun

[57] ABSTRACT

A fat substitute is disclosed which comprises water-dispersible macrocolloid particles composed of starch materials selected from the group consisting of taro, Saponaria vaccaria, Amaranthus retroflexus, Maranta arundinacea, Wheat B and buckwheat, which particles have a substantially spheroidal shape and a particle size distribution effective to impart the substantially smooth organoleptic character of an oil-and-water emulsion.

9 Claims, No Drawings

CARBOHYDRATE CREAM SUBSTITUTE

This application is a continuation-in-part of application Ser. No. 07/678,897 filed Mar. 28, 1991, now U.S. Pat. No. 5,153,020, the disclosure of which is hereby incorporated by reference and which is a continuation of application Ser. No. 07/367,322, filed Jun. 20, 1989, which is a continuation-in-part of application Ser. No. 211,494 filed Jun. 24, 1988, now U.S. Pat. No. 4,911,946, the disclosure of which is hereby incorporated by reference.

SUMMARY OF THE INVENTION

In accordance with the present invention, carbohydrate particles comprising starch granules selected from the group consisting of taro (from Colocasia esculenta), Saponaria vaccaria, Amaranthus retroflexus (Pigweed), Maranta arundinacea, Wheat B and buckwheat starches display fat-like mouthfeel characteristics when the hydrated particles have a substantially spheroidal shape and a mean particle size distribution ranging from about 0.1 microns to 4 microns, with less than about 2% of the total number of particles exceeding 5 microns in diameter. These starches are characterized by small granule sizes (i.e., taro (1.4–4.0 microns), Saponaria vaccaria (0.5–1.6 microns), Amaranthus retroflexus (0.75–1.25 microns); buckwheat (1.3–12 microns)) and are particularly suitable for crosslinking with phosphorous oxychloride and according to other methods to provide stable cream substitutes. The dispersion of macrocolloidal particles can replace all or a portion of the fat or cream in food products such as ice cream, yogurt, salad dressings, mayonnaise, cream, cream cheese, other cheeses, sour cream, sauces, icings, whipped toppings, frozen confections, milk, coffee white and spreads.

DETAILED DESCRIPTION OF THE INVENTION

EXAMPLE 1

In this example, small granule starches were stabilized by cross-linking with tannic acid to produce cream substitutes. Specifically an aqueous starch suspension (17 g starch/28 ml water) was heated in a water bath to 45° C., with stirring, and the pH was adjusted with 1 N NaOH (pH 8–11.4). After crosslinking was achieved (1–6 hours), the suspension was neutralized to pH=6.5 to 7.00, and twice centrifuged with 200 ml of water (5000 rpm for 10 min.), and either dried in a vacuum oven or freeze dried for storage.

Amaranth starch treated as described above (2% w/w, pH=11.4, 2 hours) gave a slightly off-white powder. The taste of its aqueous suspensions was rated as being creamy by a sensory panel. The stabilized starch displayed higher thermal stability as demonstrated by a differential scanning calorimetry (DSC) endotherm ($T_g$) at 70.94° C. The cross-linked starch had an improved water holding capacity (up to 10.20 g). Crosslinking of a similar suspension at pH=8 for 1 hour gave a stabilized product with $T_g$ 69.7° C. and average particle size of 1.66 microns.

Wheat B starch treated as described above gave a creamy suspension, whose water holding capacity was up to 4.980 g.

EXAMPLE 2

In this example, cross-linking was performed as described in Example 1 using Tamarind extract instead of tannic acid as cross-linking agent. Crosslinking of Amaranth starch according to the above procedure (2% w/w, pH=8, 1 hour) gave a creamy-tasting product with $T_g$ of 73.97° C. and a water holding capacity of 9.780 g. Wheat B starch according to the above procedure (2% w/w, pH=8, 1 hour) gave a creamy-tasting product with T, of 89.29° C. and water holding capacity of 4.601 g.

EXAMPLE 3

In this example, cross-linking was performed as described in Example 1 using Tamarind seed powder instead of tannic acid as cross-linking agent. Crosslinking of Amaranth starch according to the above procedure (2% w/w, pH=8, 2 hr) gave a creamy-tasting, off-white product with $T_g$ of 65.91° C. and water holding capacity of 10.13 g. When the same procedure was conducted for 6 hours, the resulting product had a $T_g$ of 68.49° C. and water holding capacity of 9.612 g.

EXAMPLE 4

In this example, Amaranth starch granules were stabilized by cross-linking with ortho-phosphoric acid. Specifically, an aqueous Amaranth starch suspension (17 g starch/28 ml water) was heated in a water bath to 45° C. with stirring, and the pH was adjusted with 1 N NaOH (pH 8-11.4). After crosslinking was achieved (1–6 hours), the suspension was neutralized to pH=6.5 to 7.00, and twice centrifuged with 200 ml of water (Sorvall 5000 rpm for 10 minutes), and either dried in a vacuum oven or freeze dried for storage. The treated Amaranth starch above (2% w/w, 2 hours) gave a slightly off-white powder. The taste of its aqueous suspensions was rated to be creamy by a sensory panel. The stabilized starch displayed higher thermal stability as demonstrated by DSC endotherm ($T_g$) at 78.07° C.

EXAMPLE 5

In this example, Amaranth starch granules were stabilized by cross-linking with phosphorous oxychloride. Specifically, an aqueous starch suspension (10 parts starch in 24 parts water and 1 part sodium chloride) was heated in a water bath to 40° C., with stirring, and the pH was adjusted with 1 N NaOH (pH 11.6). After cross-linking was achieved (1–8 hours), the suspension was neutralized to pH=5.2 with 20% aqueous HCl, and twice centrifuged with 200 ml of water (5000 rpm for 10 minutes), and either dried in a vacuum oven or freeze dried for storage.

Amaranth starch treated as described above (2% w/w, 2 hr) gave a slightly off-white powder. The taste of its aqueous suspensions was rated to be creamy by a sensory panel. The stabilized starch displayed higher thermal stability as demonstrated by a DSC endotherm ($T_g$) at 80.41° C. and average particle size of 0.96 microns.

EXAMPLE 6

In this example, starch was stabilized by heat treatment to produce cream substitutes. An aqueous suspension of starch (17 g starch/28 ml water) was heated in a water bath at different temperatures (50–80° C.) for 3 hours. The product was isolated as described in Example 1 above. Specifically, an aqueous Amaranth suspension heated to 70° C., gave a slightly off-white powder. The taste of its aqueous suspensions was rated creamy by a sensory panel. The stabilized starch displayed higher thermal stability as demonstrated by a DSC endotherm ($T_g$) at 75.37° C., and had a water holding capacity of 8,619 g. The average particle diameter was 1.74 μm. A sample heated to 80° C. showed a $T_g$ at 81.61° C.

An aqueous Wheat B suspension treated according to the above procedure and heated to 70° C., gave a slightly off-white powder. The taste of its aqueous suspensions was rated creamy by a sensory panel. The stabilized starch displayed higher thermal stability as demonstrated by a DSC endotherm ($T_g$) at 78.5° C., and had a water holding capacity of 5.1 g. The average particle diameter was 1.05 microns. A sample heated to 65° C. showed a $T_g$ of 70.7° C. and had a water holding capacity of 5.7 g.

An aqueous Taro starch suspension treated according to the above procedure and heated to 70° C., gave a slightly off-white powder. The taste of its aqueous suspensions was rated creamy by a sensory panel. The stabilized starch displayed higher thermal stability as demonstrated by a DSC endotherm ($T_g$) at 85° C., and had a water holding capacity of 10.28 g.

An aqueous buckwheat starch suspension treated according to the above procedure and heated to 80° C., gave a slightly off-white powder. The stabilized starch displayed higher thermal stability as demonstrated by the fact that the DSC thermogram showed no transition up to about 95° C.

An aqueous Arrow root (Maranta arundinacea) starch suspension treated according to the above procedure and heated to 70° C., gave a slightly off-white powder. The taste of its aqueous suspensions was rated creamy by a sensory panel. The stabilized starch displayed higher thermal stability as demonstrated by a DSC endotherm ($T_g$) at 78° C.

The foregoing specific examples are provided for purposes of illustration only and it will be apparent to one of ordinary skill in the art that many changes and modifications can be made thereto. Therefore, the scope of the invention is to be limited solely by the appended claims.

I claim:

1. A water-dispersible macrocolloid comprising substantially non-aggregated macrocolloidal particles of a starch having a substantially spheroidal shape and a mean particle-size distribution ranging from about 0.1 microns to 4 microns, with less than about 2% of the total number of particles exceeding 5 microns in diameter, the particles in a hydrated state effective to form a macrocolloid having the substantially smooth organoleptic character of an oil-in-water emulsion wherein the starch particles are selected from the group consisting of taro, Saponaria vaccaria, Amaranthus retroflexus, Maranta arundinacea, Wheat B and buckwheat starches.

2. A method of simulating the mouthfeel of fat and/or cream in a food product which comprises providing to said food product a water-dispersible macrocolloid of substantially non-aggregated hydrated starch particles having a substantially spheroidal shape and a mean particle size distribution ranging from about 0.1 microns to about 4 microns with less than about 2% of the total number of particles exceeding 5 microns in diameter, effective to form a macrocolloid having the substantially smooth organoleptic character of an oil-in-water emulsion wherein the starch particles are selected from the group consisting of taro, Saponaria vaccaria, Amaranthus retroflexus, Maranta arundinacea, Wheat B and buckwheat starches.

3. In a food product containing fat and/or cream, the improvement which comprises:

substituting for all or a portion of the fat and/or cream, a water-dispersible macrocolloid of substantially non-aggregated hydrated starch particles having a substantially spheroidal shape and a mean particle-size distribution ranging from about 0.1 microns to about 4 microns with less than about 2% of the total number of particles exceeding 5 microns in diameter, effective to form a macrocolloid having the substantially smooth organoleptic character of an oil-in-water emulsion wherein the starch particles are selected from the group consisting of taro, Saponaria vaccaria, Amaranthus retroflexus, Maranta arundinacea, Wheat B and buckwheat starches.

4. The improved food product of claim 3 which is an analog of an ice cream frozen dessert product.

5. The improved food product of claim 3 which is an analog of a high acid product selected from the group consisting of salad dressings and mayonnaise.

6. The improved food product of claim 3 which is an analog of a solid dairy product selected from the group consisting of cheeses and cream cheese.

7. The improved food product of claim 3 which is an analog of a semi-solid product selected from the group consisting of icings and spreads.

8. The improved food product of claim 3 which Is an analog of a whipped topping.

9. The improved food product of claim 3 which is an analog of a sauce.

* * * * *

UNITED STATES PATENT AND TRADEMARK OFFICE
CERTIFICATE OF CORRECTION

PATENT NO. : 5,370,894

DATED : December 6, 1994

INVENTOR(S) : Norman S. Singer

It is certified that error appears in the above-identified patent and that said Letters Patent is hereby corrected as shown below:

Column 2, line 7, "with T," should be --with $T_g$--.

Column 2, line 25, "to 45°C." should be --to 45°C,--.

Column 3, line 3, "of 8,619 g" should be --of 8.619 g--.

Column 4, line 47, "which Is" should be --which is--.

Signed and Sealed this

Eighteenth Day of April, 1995

Attest:

BRUCE LEHMAN

*Attesting Officer*  *Commissioner of Patents and Trademarks*